(12) United States Patent
Lundin

(10) Patent No.: US 6,618,530 B1
(45) Date of Patent: Sep. 9, 2003

(54) APPARATUS FOR TRANSPORTING AND DISTRIBUTING LIGHT USING MULTIPLE LIGHT FIBERS

(75) Inventor: David J. Lundin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/203,951

(22) Filed: Dec. 2, 1998

(51) Int. Cl.$^7$ ................................................ G02B 6/04
(52) U.S. Cl. ........................ 385/121; 385/119; 385/120
(58) Field of Search ................................ 385/115, 116, 385/117, 118, 119, 120, 121, 31

(56) References Cited

U.S. PATENT DOCUMENTS

| | | | |
|---|---|---|---|
| 3,933,409 A | 1/1976 | Kloots | 350/96 B |
| 4,101,188 A | 7/1978 | Yevick | |
| 4,184,739 A | 1/1980 | D'Auria et al. | 350/96.15 |
| 4,422,719 A | 12/1983 | Orcutt | 350/96.3 |
| 4,743,082 A | 5/1988 | Mori | |
| 4,807,963 A * | 2/1989 | Iwasaki | 385/212 |
| 4,918,579 A | 4/1990 | Bennett | 362/32 |
| 4,932,747 A * | 6/1990 | Russell et al. | 385/212 |
| 4,941,734 A * | 7/1990 | Williams et al. | 350/321 |
| 4,976,508 A | 12/1990 | Okura et al. | 350/96.23 |
| 5,030,321 A | 7/1991 | Coutandin et al. | 156/643 |
| RE33,722 E | 10/1991 | Scifres et al. | |
| 5,058,985 A | 10/1991 | Davenport et al. | 385/115 |
| 5,109,448 A | 4/1992 | Coden et al. | 385/46 |
| 5,208,884 A | 5/1993 | Groh et al. | 385/46 |
| 5,222,180 A | 6/1993 | Kuder et al. | |
| 5,259,056 A | 11/1993 | Davenport et al. | 385/115 |
| 5,311,604 A | 5/1994 | Rogner et al. | 385/14 |
| 5,346,655 A | 9/1994 | Blyler, Jr. et al. | |
| 5,369,721 A | 11/1994 | Conti | 385/115 |
| 5,530,940 A * | 6/1996 | Ludwig, Jr. et al. | 385/31 |
| 5,629,996 A | 5/1997 | Rizkin et al. | 385/31 |
| 5,751,870 A | 5/1998 | Forkner et al. | 385/33 |
| 5,790,723 A | 8/1998 | Riser et al. | 385/31 |
| 5,790,725 A | 8/1998 | Rykowski et al. | 385/33 |
| 5,791,756 A | 8/1998 | Hulse et al. | 362/32 |
| 5,838,865 A | 11/1998 | Gulick | |
| 5,857,041 A | 1/1999 | Riser et al. | 385/31 |
| 5,862,285 A * | 1/1999 | Danielian et al. | 385/116 |
| 6,296,383 B1 | 10/2001 | Henningsen | |

FOREIGN PATENT DOCUMENTS

| | | | |
|---|---|---|---|
| EP | 284 098 | 9/1988 | G02B/6/06 |
| EP | 579 357 A1 | 1/1994 | G02B/6/42 |
| EP | 833 174 A2 | 4/1998 | G02B/6/28 |
| GB | 43 09 389 A1 | 9/1993 | F21S/5/00 |
| WO | WO 00/33112 | 6/2000 | G02B/6/06 |

OTHER PUBLICATIONS

P. J. Severin et al.: "Passive Components For Multimode Fiber–Optic Networks" Journal of Lightwave Technology., vol. LT–4, No. 5, May 1986, pp. 490–495, XP002159762, IEEE. New York, US, ISSN: 0733–8724 the whole document.

USSN 09/026836, entitled "Method and Apparatus for Seamless Microreplication Using an Expandable Mold", filed Feb. 20, 1998.

USSN 09/205849, entitled "Method and Apparatus for Adjusting Flux Emitted from Branched Light Fibers", filed Dec. 4, 1998.

Brochure entitled "Rapid Prototyping and Silicone Mold-making Materials" by W. Bruce Campbell, Dow Corning Corporation, 1996. Form 10–702–96.

* cited by examiner

Primary Examiner—Frank G. Font
Assistant Examiner—Sang H. Nguyen

(57) ABSTRACT

A light transport device comprises light fibers that individually have predetermined cross sections at one end that may be bundled together to provide a continuous plane, suitable for light input or output, that is substantially free of voids and free of non-light-transmitting materials. The other end of the individual light fibers has a cross section that is useful for injection or emission of light from a single fiber.

23 Claims, 2 Drawing Sheets

APPARATUS FOR TRANSPORTING AND DISTRIBUTING LIGHT USING MULTIPLE LIGHT FIBERS

FIELD OF THE INVENTION

The present invention relates generally to methods and apparatuses for transporting light from a single light source to multiple locations, and more specifically, to a method and apparatus for transporting light from a single light source to multiple locations using a plurality of light fibers.

BACKGROUND OF THE INVENTION

Optically transmissive materials, such as glass or polymers, may be used in a light guide to propagate light. A light guide typically includes at least one surface adapted to receive light from a light source and an optically smooth surface adapted to reflect light which is propagating along or through the light guide. Common examples of light guides include optical fibers of the type traditionally used in the data communication industry and, more recently, light fibers of the type disclosed in U.S. Pat. No. 4,422,719 (Orcutt) which are used for illumination purposes. Another example of light guides are the planar light guides used in the optical display industry. In these devices, at least one end of the surface of the light guide is adapted to receive light from a light source, and the light so received propagates between the two major surfaces of the light guide.

Multiple light fibers can be bundled together to form a light transport device that accepts light from a single source and emits light in different directions that are determined by the orientation of the output ends of the fibers. A known light transport device that employs a bundle of light fibers is disclosed in U.S. Pat. No. 5,058,985 (Davenport et al.). This device includes a series of fibers having input ends that are bundled together to form a light injection surface. Light is directed into the light injection surface from a light source. The amount of light injected or coupled into the fibers through the injection surface is increased by compressing the input ends of the fibers to reduce or eliminate voids between adjacent fibers. Light entering a void cannot be transmitted through the fiber and thus represents a diminution in coupling efficiency.

The technique described in Davenport et al. has a number of limitations, however. For example, the light fibers must be formed from a compression-deformable material. Hence, the technique precludes the use of non-deformable materials such as glass. In addition, a sleeve having a tapered bore is required for receiving and compressing the fibers. Also, the device requires cladding material, which surrounds the fiber core within the bundled input end. The cladding material consumes space within the bundle, so that proportionately less light can be introduced into the fibers (or, proportionately fewer fibers can be included within the bundle). Removing the cladding (which is not described in the '985 patent) would constitute an extra costly and time-consuming step. Finally, compressing the fibers in the manner required by this patent may create non-uniformities through cross-sections of the fibers, which may introduce scattering points in the fibers.

There is thus a need in the art for a light transfer device comprising a plurality of fibers, each having first and second ends, wherein at least the first ends of the fibers are arranged into an injection surface that is substantially free of voids or cladding materials. There is also a need in the art for a method for making such a device which does not require compression deformation of the fibers in the vicinity of the injection surface or the use of a compression sleeve. These and other needs are met by the present invention, as hereinafter described.

SUMMARY OF THE INVENTION

In one aspect, the present invention relates to a light fiber which is prefabricated with a cross-sectional shape on at least a first end (hereinafter termed the "contacting end"), the cross-sectional shape being such that a plurality of the fibers can be assembled with their contacting ends adjacent to each other so as to form a planar light injection surface which is substantially free of voids, cladding, and other non-light-guiding materials or features. The contacting ends have a prescribed cross-sectional shape prior to contacting one another such that, when they are brought into contact, the outer edges can assume an orientation completely contiguous with one another so that the light injection plane is substantially free of voids while each of the contacting ends maintains its respective prescribed cross-sectional shape.

In some embodiments of this aspect of the invention, at least one of the contacting ends has a noncircular cross-sectional shape. Such noncircular cross-sectional shapes include, for example, sectors or polygons (e.g., squares, rectangles, hexagons, etc.). In other embodiments, each of the plurality of contacting ends has a unique cross-sectional shape. In still other embodiments, at least one of the contacting ends has an irregular cross-sectional shape.

In another aspect, the present invention relates to a device which comprises a plurality of light fibers $n_1, \ldots, n_k$ wherein k is an integer greater than or equal to 2, wherein each of the fibers has a contacting end, and wherein the contacting ends are capable of being assembled into a coplanar orientation so as to form an essentially continuous input plane. Each of the k light fibers has a contacting end with a cross-sectional shape corresponding to a sector such that fiber $n_i$ has a sector with an arc length of $a_i$ that subtends an angle $\phi_i$, wherein $a_1 + \ldots + a_k = 2\pi$ radians, and wherein $\phi_1 + \ldots + \phi_k = 360°$. The radii of all k sectors are typically equal, i.e., the fibers can be arranged so that the sectors lie in the same plane and form a circle, although analogous embodiments are also possible wherein the sectors can be arranged to form an ellipse or other geometric shape. The arc lengths of all k sectors are also typically equal, i.e., $a_1 = \ldots = a_k$, although in some embodiments, at least two elements $a_m$, $a_n$ of the set $a_1, \ldots, a_k$ are not equal, i.e., $a_m \neq a_n$.

In another aspect, the present invention relates to a device comprising a plurality of fibers, each of the fibers having a contacting end, wherein the contacting ends are capable of being assembled into a coplanar orientation so as to form an essentially continuous input plane. Each of the contacting ends has a prescribed cross-sectional shape prior to contacting one another that is conformably coated by a cladding layer, the cladding layer comprising a material/substance having a refractive index less than that of the light fiber that comprises the contacting end. Preferably, the cladding layer is thin and constitutes a small percentage of the total surface of the continuous plane.

In the various embodiments of the various aspects of the present invention, the non-contacting end of at least one of the light fibers may have a circular cross-section. Alternatively, in some embodiments of the invention, the non-contacting end of at least one of the light fibers has a cross-sectional shape corresponding to the prescribed cross-sectional shape of its contacting end. In other embodiments, the non-contacting end of at least one of the light fibers has a cross-sectional shape different from the prescribed cross-sectional shape of the contacting end. In those embodiments where the contacting and non-contacting ends of a light fiber differ in shape, the light fiber may undergo a transition from the cross-sectional shape of its contacting end to the cross-sectional shape of its non-contacting end. This transition may occur over a predetermined portion of the length of the light fiber, which in some cases may be the entire length of the fiber.

In a further aspect, the present invention relates to a device comprising a plurality of light fibers, each having a contacting end. The contacting ends are arranged into a light injecting plane that is substantially free of both voids and non-light guiding material such as a cladding, i.e., the adjacent fiber cores are in direct contact with one another.

In yet another aspect, the present invention relates to a method for transporting light from a single source to multiple prescribed locations. In accordance with the method, light is directed into a light injection plane formed by a plurality of light fiber input ends. The input ends of each light fiber have a prescribed cross-sectional shape selected such that adjacent input ends have outer peripheries contiguous with one another so that the light injection plane is substantially free of voids or other non-light-guiding materials. The output ends of the light fibers are then oriented so that light emitted therefrom is applied to the respective prescribed locations.

In still another aspect, the present invention relates to a method for making a light transport device. In accordance with the method, a plurality of light fibers are provided, each having a contacting end and a non-contacting end. The contacting end of each of the light fibers has a prescribed cross-sectional shape prior to being brought into contact with one another. The prescribed cross-sectional shapes are selected so that, when the outer edges of the contacting ends are brought together in a given orientation, they contact one another in a completely contiguous manner. The contacting ends are then arranged in a light injection plane such that the outer edges of adjacent contacting ends are completely contiguous with one another so that the light injection plane is substantially free of voids and non-light-guiding material.

BRIEF DESCRIPTION OF THE DRAWINGS
DESCRIPTION OF THE DRAWINGS

DETAILED DESCRIPTION

As used herein, the term "sector" shall be used in reference to a geometric figure bounded by two radii and the included arc of a circle.

Figure 1:
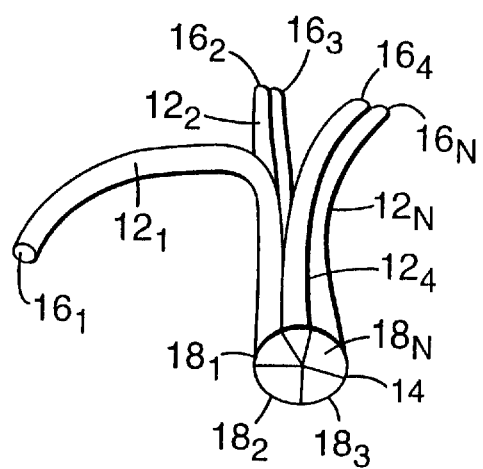
FIG. 1 depicts a perspective view of an exemplary light transport device constructed in accordance with the present invention.

FIG. 1 depicts a perspective view of a light transport device constructed in accordance with the present invention. A plurality of light fibers $12_1, 12_2, \ldots 12_N$ are brought into contact with one another at their respective input ends $18_1, 18_2, \ldots 18_N$. Input ends $18_1, 18_2, \ldots 18_N$ form a light injection surface 14 into which light from a light source is directed. As is well known, light injected into the individual input ends of each fiber is transported along the fiber core in accordance with the principles of total internal reflection. Fibers $12_1, 12_2, \ldots 12_N$ have output ends $16_1, 16_2, \ldots 16_N$ that emit the light transmitted therethrough. Since the light fibers are flexible and need to remain in contact with one another only at their input ends, the output ends of the light fibers may be arranged in any desired configuration so that light can be provided to different locations. For example, as seen in FIG. 1, fibers $12_1, 12_2,$ and $12_4$ each emit light in a different direction.

Figure 2:
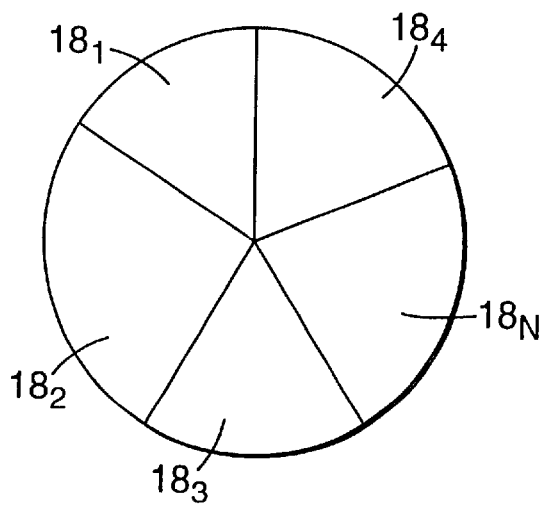
FIG. 2 depicts a front view of the light injection surface seen in FIG. 1.

As best illustrated in FIG. 2, the input ends $18_1, 18_2, \ldots 18_N$ of light fibers $12_1, 12_2, \ldots 12_N$ have cross-sectional shapes that differ from the circular shape of a conventional light fiber. Specifically, in the exemplary embodiment of the invention shown in FIGS. 1 and 2, the input ends of the light fibers are sectors which contact one another without creating any empty space or voids therebetween. That is, the outer edge surfaces of the input ends of adjacent fibers are completely contiguous with one another. Since this exemplary embodiment of the present invention employs five light fibers, each input end is a sector that subtends an angle of 72 degrees. Of course, if a fewer or greater number of fibers are employed, the arc length and associated angle of each sector can be adjusted accordingly to form a light injection surface that is essentially circular. The sectors need not be of equal area. For example, three sectors could each subtend an angle of 60 degrees, while the remaining two sectors could subtend angles of 90 degrees each.

While the light transport device of the present invention may be described as a device for transporting light from a single source to a plurality of different locations, one of ordinary skill in the art will recognize that the device can be employed in reverse. That is, the device can transport light from a plurality of sources to a single location by applying light to the output ends shown in FIG. 1 and using plane 14 as a light emission plane. In this regard it should be recognized that the terms "input" and "output" as used herein to define opposing ends of light fiber are employed for descriptive purposes only and should not be construed as limiting their applicability to receiving and emitting light, respectively. In other words, in appropriate circumstances, the "input ends", as described above, may be employed to emit light and "output ends", as described above, may be employed to receive light.

Figure 3:
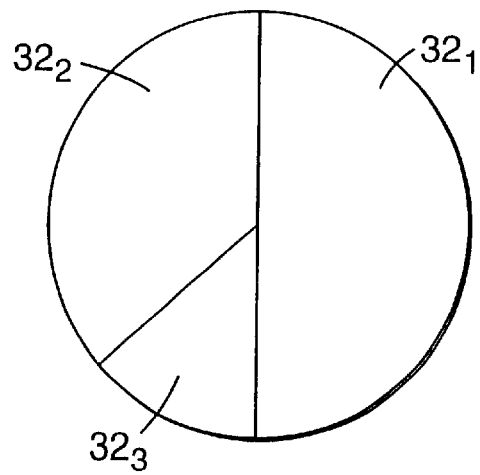
FIG. 3 depicts an alternative embodiment of the light injection surface shown in FIG. 2, in which different fibers have different radial extents.
Figure 4:
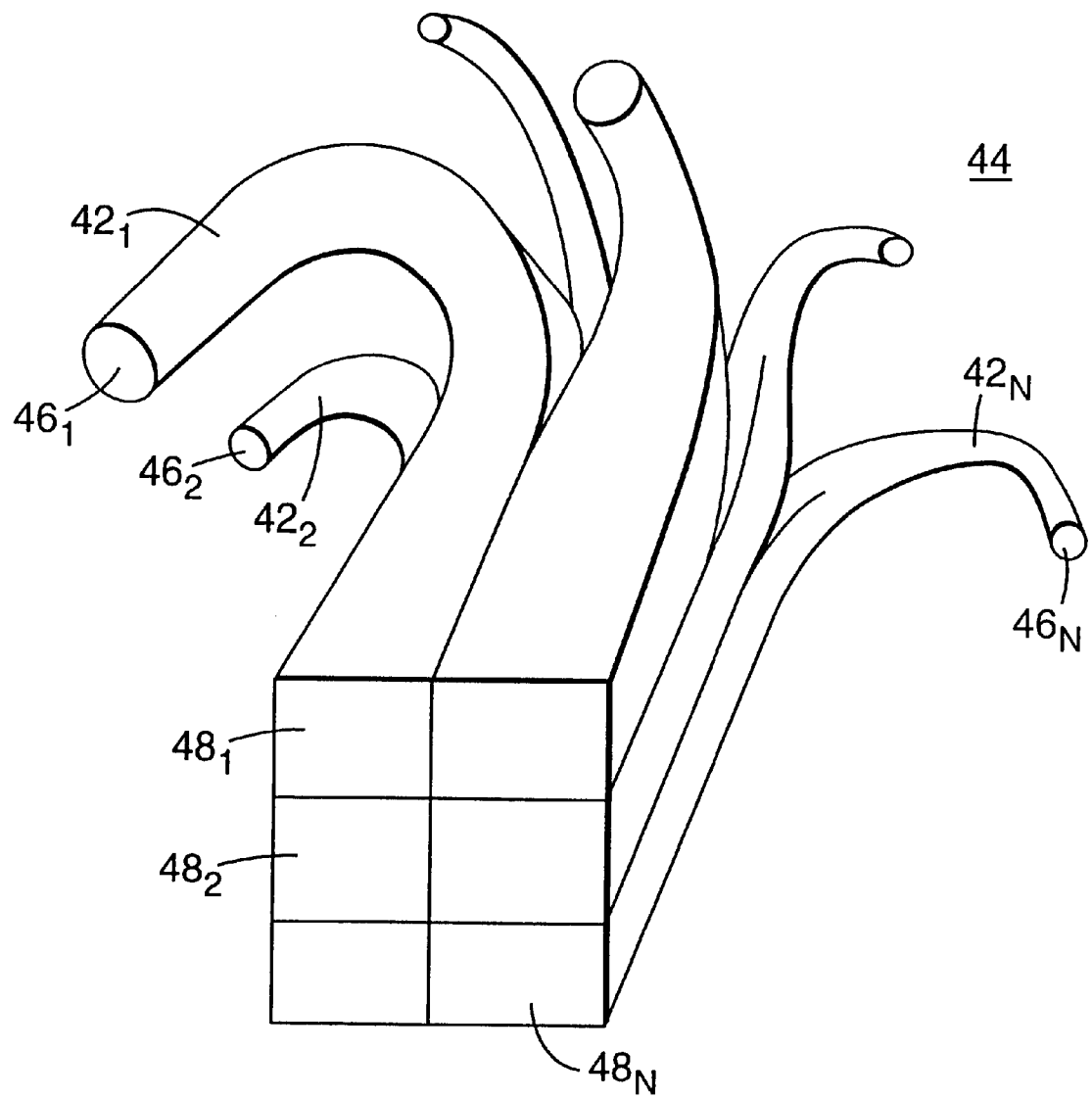
FIG. 4 depicts an alternative embodiment of the light injection surface shown in FIG. 2, in which the fibers have rectangular cross-sectional shapes.

One of ordinary skill in the art will recognize that light injection surfaces may be formed from many different packing configurations in accordance with the principles of the present invention. For example, the sectors shown in FIG. 2 need not have the same dimensions. Rather, as shown in FIG. 3, the sectors may differ in radial extent. In FIG. 3, for example, fiber $32_1$ extends over 180 degrees, fiber $32_2$ extends over 135 degrees, and fiber $32_3$ extends over 45 degrees. Moreover, the cross-sectional shape of the fiber input ends need not be sectors. FIG. 4 shows an alternate configuration, in which the light injection surface comprises a number of rectangular ends. Each end $48_1, 48_2, \ldots 48_N$ of fibers $42_1, 42_2 \ldots 42_N$ can have a cross-section that is approximately square, and fibers $42_1, 42_2 \ldots 42_N$ can be molded so as to have an approximately circular cross-sectional configuration at respective output ends $46_1, 46_2, \ldots 46_N$. In general, the input ends of the light fibers can have any shape, regular (e.g., hexagonal or polygonal) or irregular, provided the resulting light injection surface is substantially free of voids. Additionally, the shape of the input ends need not all be the same. For example, the light fibers may be irregular shapes that interlock with one another, analogous to the pieces of a puzzle.

In some embodiments of the invention the light injection surface is free not only of voids, but also of any materials or features (e.g., cladding) that interfere with the transmission of light into the fibers. In other words, the light fibers may consist simply of a core that is free of any surrounding cladding material. In these embodiments of the invention, adjacent fiber cores are in direct contact with one another.

In other embodiments of the invention, some cladding material may be present at the light injection surface. In these embodiments, the cladding material conformably coats each of the shaped light fiber ends. Preferably, the cladding material is thin and constitutes a minor percentage of the light injection surface.

The particular packing arrangement that is used for any given application will be determined by a number of parameters, including the number of light fibers employed, the cross-sectional areas of the individual fibers (fibers with a greater cross-sectional area will transport a greater fraction of the total available light), and the cross-sectional shape of the input ends of the fibers. The values of these parameters will in turn be selected based on the given application for which the light transport device is to be used.

As seen in FIG. 1, the light fibers may undergo a gradual transition in their cross-sectional shape between their respective input and output ends. In the FIG. 1 embodiment, for example, while the input ends are shaped as sectors, the output ends are circular in shape, as in a conventional light fiber. The transition may occur over the entire length of fiber, or only over a portion thereof. In general, the cross-sectional shape of the input ends of the light fibers may be selected independently of the cross-sectional shape of the output ends. That is, the input and output ends may or may not have the same cross-sectional shape. While the shapes of the input and output ends of the light fibers may differ, it is advantageous in many embodiments that the fibers maintain substantially the same total cross-sectional area across their lengths so that light loss from the fiber is minimized.

The input ends of the light fibers forming the light injection surface may be held in place at the light input area by heat shrink tubing or by other appropriate mechanical or chemical bonding means.

The individual light fibers of the light transport device of the present invention may be fabricated in a molding process using, for example, a conventional two piece mold. Alternatively, the mold may be an expandable mold of the type disclosed in U.S. application Ser. No. 09/026,836, entitled "Method and Apparatus for Seamless Microreplication Using an Expandable Mold." Briefly, an expandable mold is formed from a flexible material having a generally hollow portion that corresponds to the shape of the desired finished article (i.e., the light fiber). The hollow portion is accessible through at least one opening. The hollow portion is filled with a curable material that hardens in the shape of the hollow portion of the mold. Once hardened, the finished article is removed by applying a pressure differential between the inside and outside of the mold so that the walls of the mold distend to facilitate removal of the molded article. Additional details concerning the expandable mold may be found in the previously mentioned patent application, which is hereby incorporated by reference in its entirety (including drawings) as if repeated herein.

Regardless of the type of mold that is employed, the curable material that forms the finished article may be any material that cures into a substantially optically transparent material and which can be introduced into the mold and cured at temperatures and/or pressure conditions that do not adversely affect the mold. The curable material may be curable by heat, radiation, or other known processes. Suitable curable materials are well known to the art and include polymerizable compounds and mixtures. Acrylates are a class of curable materials that are preferable for their transparency properties. Urethanes are also a desirable class of curable materials because their contraction during curing tends to be minimal, although only certain formulations have desirable transparency properties. Silicones comprise another desirable class of curable materials because of their transparency and heat resistance. Advantageously in the present invention, rigid materials, including rigid thermoplastics such as poly(methyl methacrylate, PMMA) or polycarbonate, can also be used in the present invention, since the prescribed cross-sectional shapes of the input ends are designed to intimately contact one another within a harness or bundle without substantial deformation.

The mold itself is fabricated from a molding master that is a positive replica of the finished light fiber. The master must be fabricated with a precision equal to the precision required of the geometry of the finished light guide. Such a high precision master can be fabricated from a machinable stock material capable of being separated from the molding material after the molding material has cured. For example, the stock material may comprise a machinable metal or a hard polymer. Suitable metals include copper and aluminum, and alloys such as brass. Suitable polymers include acrylics, carbonates, and any other polymer that may be machined and which retains its shape.

The molding master also may be fabricated by any of a number of rapid prototyping techniques known in the art such as, for example stereolithography. Once the shape of the master is determined and electronically stored in a Computer-Aided Design (CAD) file, suitable equipment is used to create a three-dimensional part representing the part design. In the case of stereolithography, the equipment, under the direction of the CAD file, drives a laser beam that selectively writes a trace on the surface of a photocurable polymer. As the laser beam travels according to the part design, it cures the polymer in layers. As the layers build up, a three-dimensional part is formed. This part is then removed and polished to an optical finish to be used in mold making. See, for example, W. Bruce Campbell, *Rapid Prototyping and Silicone Moldmaking Materials*, Dow Coming Corporation (1996) Form No. 10-702-96.

The molding material from which the mold is fabricated is a liquid composition that can be solidified during a curing process. The material is preferably one that undergoes low shrinkage during the curing process and is relatively easily removable from the master. The molding material should also be chosen to reduce adherence with the molded article so that the molded article can be readily released from the mold. Suitable curable materials are well known to the art and include, for example, elastomers such as a silicone elastomers. Alternatively, when a relatively rigid thermoplastic light guide is desired, injection molding methods that are well known to those of ordinary skill in the art can be used advantageously.

The preceding description of the present invention is merely illustrative, and is not intended to be limiting. Therefore, the scope of the present invention should be construed solely by reference to the appended claims.

What is claimed is:

1. A method for making an optical device, comprising the steps of:

proving a plurality of N light guides, wherein N is an integer greater than 1, each of said light guides terminating in a first end, wherein each of said light guides has a cross-sectional shape essentially defining a sector wherein each sector subtends an angle $\phi$; and assembling the plurality of light N guides so that the light guides are in direct contact with each other, the light guides being assembled essentially without deformation and being essentially free of cladding materials where they are in direct contact, the first ends of the light guides being assembled to provide a surface that is essentially free of voids.

2. The method of claim 1, wherein said surface is substantially planar.

3. The method of claim 2, wherein said noncircular cross-sectional shape is essentially a sector.

4. The method of claim 1, wherein each of said first ends are rigid.

5. The method of claim 1, wherein said first ends have outer perimeters, the adjacent edges of which are contiguous with one another.

6. The method of claim 1, wherein at least one of said light guides has a first and second end, wherein said first end has an essentially non-circular cross-section, and wherein said second end has an essentially circular cross-section.

7. The method of claim 1, wherein each of said light guides has a first end and a second end, and wherein each of said second ends has an essentially circular cross-section.

8. The method of claim 1, wherein each of said plurality of first ends has a unique cross-sectional shape.

9. The method of claim 1, wherein said first ends have essentially identical cross-sectional shapes.

10. The method of claim 1, wherein the first and second ends of said light guides have essentially identical cross-sectional shapes.

11. The method of claim 1, wherein each of said plurality of light guides has a longitudinal axis, and wherein the cross-sectional shape of each of said plurality of light guides undergoes a transition along said longitudinal axis from a first cross-sectional shape to a second cross-sectional shape.

12. The method of claim 11, wherein said transition occurs over substantially the entire length of the light guide.

13. The method of claim 1, wherein at least one of said first ends has a noncircular cross-sectional shape.

14. The method of claim 1, wherein each of said N sectors subtends an angle of 360/N degrees.

15. The method of claim 1, wherein each of said first ends has a cross-section that essentially describes a polygon.

16. The method of claim 15, wherein said polygon is a hexagon.

17. The method of claim 16, wherein said polygon is a rectangle.

18. A method for making an optical device, comprising the steps of:

providing a plurality of light guides each terminating in a first end;

assembling the plurality of N light guides essentially without deformation so that the light guides are in direct contact with each other and are essentially free of cladding materials where they are in direct contact, the first ends of the light guides being assembled to provide a surface that is essentially free of voids, wherein N is an integer greater than 1 and wherein each of said N light guides has a cross-sectional shape that essentially defines a sector; and wherein a first of said sectors subtends an angle $\phi_1$, and wherein a second of said sectors subtends an angle $\phi_2$, and wherein $\phi_1 \neq \phi_2$.

19. A method for making an optical device, comprising the steps of:

providing a plurality of light guides $G_1, \ldots, G_N$, wherein, for k=1 to N, the $k^{th}$ light guide terminates in a planar first end which essentially defines a sector $S_k$ which subtends an angle $\phi_k$, and wherein $\phi_1 + \ldots + \phi_k = 2\pi$ radians; and assembling said light guides so that they are in direct contact with one another and are essentially free of cladding materials where they are in contact, the first ends of the assembled light guide providing a substantially coplanar arrangement, thereby forming a light input surface.

20. The method of claim 19, wherein the interior of said light input surface is substantially free of voids.

21. The method of claim 19, wherein said first ends are rigid.

22. The method of claim 19, wherein each of the first ends has a prescribed cross-sectional shape, prior to being assembled into the coplanar arrangement, such that, when the first ends are arranged into the coplanar arrangement, the adjacent edges of the first ends are contiguous with one another.

23. A method of making an optical device comprising the steps of:

providing a plurality of light guides $n_1 \ldots n_k$, wherein k is an integer greater than or equal to two, wherein each of the light guides has first planar contacting end with a cross-sectional shape corresponding to a sector with an arc length a; which subtends an angle $\phi_1$ and wherein $\phi_1 + \ldots \phi_k = 2\pi$ radians; and assembling the light guides so they are in direct contact with one another and are essentially free of cladding materials where they are in contact, the first ends of the assembled light guides providing a substantially coplanar arrangement; thereby forming a light input surface wherein a first of the sectors and a second of the sectors subtend an angle such that $\phi_1 \neq \phi_2$.

* * * * *

UNITED STATES PATENT AND TRADEMARK OFFICE
CERTIFICATE OF CORRECTION

PATENT NO. : 6,618,530 B1
DATED : September 9, 2003
INVENTOR(S) : Lundin, David J.

It is certified that error appears in the above-identified patent and that said Letters Patent is hereby corrected as shown below:

<u>Title page,</u>
Item [56], References Cited, FOREIGN PATENT DOCUMENTS, delete "GB 43 09 389 A1" and insert in place thereof -- DE 43 09 389 A1 --.

<u>Column 3,</u>
Line 44, delete "DESCRIPTION OF THE DRAWINGS".

<u>Column 5,</u>
Line 32, delete "thereof In" and insert in place thereof -- thereof. In --.

<u>Column 6,</u>
Line 48, delete "Coming" and insert in place thereof -- Corning --.
Line 59, delete "such as a silicone" and insert in place thereof -- such as silicon --.

<u>Column 8,</u>
Line 51, delete "and arc" and insert in place thereof -- and are --.

Signed and Sealed this

Twenty-fourth Day of February, 2004

JON W. DUDAS
*Acting Director of the United States Patent and Trademark Office*